UNITED STATES PATENT OFFICE.

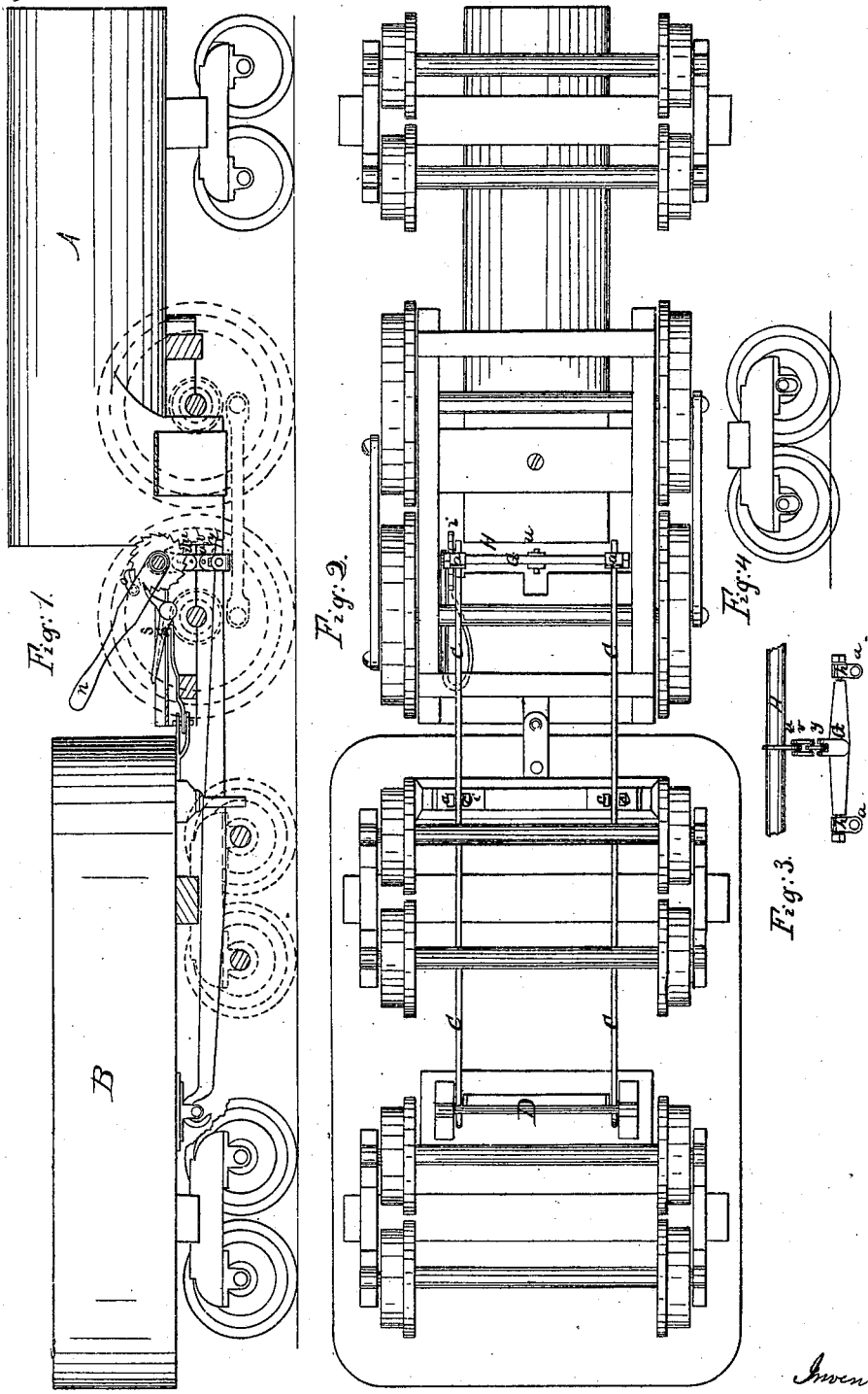

GARRET G. JONES, OF RUSHSYLVANIA, OHIO.

IMPROVEMENT IN LOCOMOTIVE STEAM-ENGINES.

Specification forming part of Letters Patent No. 92,193, dated July 6, 1869.

*To all whom it may concern:*

Be it known that I, G. G. JONES, of Rushsylvania, in the county of Logan and State of Ohio, have invented a new and valuable Improvement in Attachments to Driving-Wheels; and I do hereby declare that the following is a full, clear, and exact description of the construction and operation of the same, reference being had to the annexed drawings, making a part of this specification, and to the letters and figures of reference marked thereon.

Figure 1 of the drawings is a side plan view of my invention. Fig. 2 is a bottom plan view of the same. Figs. 3 and 4 are details.

My invention has relation to railroad-locomotives; and it consists, mainly, in the construction and arrangement of novel devices by which the weight of the front end of the tender may be easily and readily thrown upon the driving-wheels of the locomotive, the object being to prevent such driving-wheels from sliding or slipping upon the track-rail.

In the drawings, the letter A represents a locomotive, and the letter B the tender thereof.

The letters C represent two bars, hooked or pivoted over a transverse bar, D, which is arranged to the bottom of the tender in the manner shown. The forward ends of bars C are round and pointed, and adapted to pass into and rest in and be removable from the eyes $a$, hereinafter mentioned. The letters $c$ are slotted guides for the bars C. When the tender is disconnected from the locomotive the bars C rest upon the axles of said tender.

The letter H represents a shaft resting and rotating in suitable bearings in the frame of the locomotive in front of the platform, and letter $i$ is a pinion affixed thereto.

The letter $n$ represents a lever attached to the shaft H, to which is affixed the dog $o$, working in the teeth of the pinion $i$, as shown.

The letter $s$ represents a pawl so arranged that it may be actuated by the operator's foot, and which works in the teeth of pinion $i$.

The letter $u$ represents an arm extending forward from the center of shaft H, to the front end of which is hinged the slotted connecting-arm $v$. This bar $v$ is connected by pivot at its front end with the single bar $y$, the two forming together a species of chain, as shown in Fig. 3.

The letter G represents a transverse pendent bar, suspended to the shaft C by the chain above mentioned, and the letters $h$ are pendent arms attached to and swinging upon the respective ends thereof in the manner shown. The eyes $a$, in which the front ends of the bars C rest when the tender is coupled to the locomotive, are formed in these pendent arms $h$.

The bearings of the axles of the front wheels of the locomotives are slotted, as shown on Fig. 4, the object thereof being to allow the wheels to remain on the track while the front end of the tender is raised. To operate my device I raise the lever $n$ repeatedly until the bar H raises the bars C and with them the front end of the tender. To lower the bars C and relieve the driving-wheels from the weight of the tender, I place a foot upon the treadle of the pawl $s$. This movement releases the pawl from the teeth of pinion $i$, and the weight of the tender is restored to its appropriate wheels.

What I claim as my invention, and desire to secure by Letters Patent, is—

1. The bars C, D, and G, connected by a chain, as described, with shaft H, arranged substantially as specified.

2. In combination with the lifting devices herein described and shown, the slotted bearings (Fig. 4) for the front wheels of the tender, substantially as specified.

3. In combination with the shaft H, pinion $i$, bars C, D, and G, the lever $n$, dog $o$, and pawl $s$, when constructed and arranged substantially as described.

In testimony that I claim the above I have hereunto subscribed my name in the presence of two witnesses.

GARRET G. JONES.

Witnesses:
ROBT. A. McEILLOD,
DUNCAN DOW.